US007286451B2

(12) United States Patent
Wirtz et al.

(10) Patent No.: US 7,286,451 B2
(45) Date of Patent: Oct. 23, 2007

(54) COPY CONTROL USING DIGITAL SPEED BUMPS

(75) Inventors: Gijsbrecht Carel Wirtz, Eindhoven (NL); Antonius Adrianus Cornelis Maria Kalker, Eindhoven (NL); Antonius Adriaan Maria Staring, Eindhoven (NL); Jaap Andre Haitsma, Eindhoven (NL); Johan Paul Marie Gerald Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 37 days.

(21) Appl. No.: 10/521,134

(22) PCT Filed: Jun. 23, 2003

(86) PCT No.: PCT/IB03/02935

§ 371 (c)(1),
(2), (4) Date: Jan. 12, 2005

(87) PCT Pub. No.: WO2004/008457

PCT Pub. Date: Jan. 22, 2004

(65) Prior Publication Data

US 2005/0254371 A1 Nov. 17, 2005

(30) Foreign Application Priority Data

Jul. 17, 2002 (EP) ................................ 02077902

(51) Int. Cl.
*G11B 7/00* (2006.01)

(52) U.S. Cl. .............................. 369/47.12; 369/53.21; 369/84; 726/27; 726/30; 726/31; 726/33

(58) Field of Classification Search ............ 369/47.12, 369/53.21, 84; 726/27–33
See application file for complete search history.

(56) References Cited

U.S. PATENT DOCUMENTS

| 5,610,893 | A | * | 3/1997 | Soga et al. | 369/53.24 |
| 5,943,311 | A | * | 8/1999 | Takenaka | 369/47.12 |
| 6,002,973 | A | * | 12/1999 | Giegold | 701/35 |
| 6,148,342 | A | * | 11/2000 | Ho | 709/225 |
| 6,288,989 | B1 | * | 9/2001 | Ro et al. | 369/47.13 |
| 6,603,718 | B1 | * | 8/2003 | Ozawa | 369/47.1 |
| 2002/0021635 | A1 | * | 2/2002 | Park et al. | 369/47.12 |

FOREIGN PATENT DOCUMENTS

| EP | 1058257 A1 | 12/2000 |
| EP | 1107253 A2 | 6/2001 |

* cited by examiner

*Primary Examiner*—Wayne Young
*Assistant Examiner*—Linh T. Nguyen
(74) *Attorney, Agent, or Firm*—Paul Im

(57) ABSTRACT

A digital media recorder and a method of controlling such are provided. During attempts to copy media content, sub-sequences are extracted from an input media sequence. A digital fingerprint of the sub-sequence is calculated and compared with at least one first reference fingerprint from a database. The outcome of the comparison determines the action to take in the further processing. Recording of the input media sequence on a media carrier is either allowed or obstructed, e.g. disallowed. In the case recording of the sequence is allowed, the database is updated with information that the digital media sequence has been recorded.

16 Claims, 2 Drawing Sheets

COPY CONTROL USING DIGITAL SPEED BUMPS

TECHNICAL FIELD

The present invention relates in general to the field of copy protection of digitally recorded media, and in particular to a method for controlling a digital media recorder and such a recorder.

BACKGROUND

More or less unauthorized copying of media content that is copyright protected has been an important issue for a long period of time. For example, audio records have been copied onto cassette tapes and television programs and films have been copied onto video tape. Unauthorized copies of such types of analog recording media have all been marred by at least a slight decrease of quality as compared to the original recordings.

However, the issue has become even more important as the media industry has entered "the digital era". Music and films are now being distributed in digitally encoded form and copies of these are usually indistinguishable from the original, creating an even bigger market for "pirate" of media content.

To illustrate the situation one can consider the recordable compact disc, i.e. the CD-R. These are usually intended for recording audio content. However, any media content may be recorded on such discs. Moreover, while the following discussion will be exemplified by CD-R, there exist other digital recording media capable of recording media in the form of, e.g., films that are equally relevant for the discussion.

Ever since its market introduction, CD-R has been an overwhelming success story. One of the main factors contributing to its rapid acceptance is that consumers now have the possibility to make digital quality copies of the most popular audio format—the Compact Disc—that will play in any CD player. Whereas CE style CD recorders, i.e. dedicated digital audio copying devices, have to implement the Serial Copy Management System (SCMS), which limits duplication of copyright asserted discs to first generation copies, there are no built-in limitations for PC based CD recorders. The latter has become a huge problem from the perspective of the content owners, which are facing the horror scenario that immediately after release of, e.g., a new music album, large numbers of CD-R copies are traded or offered for sale on school yards and similar environments. Consequently, and especially in combination with the mp3 phenomenon on the Internet, content owners consider CD-R a major factor in the stagnating growth of CD sales.

Technical measures that prevent misuse of recorders, such as making large numbers of copies are therefore highly desirable. At the same time the convenience of the devices should not be compromised, e.g. if copying is allowed by the owner of the content, then one should be able to do so at high speed.

A prior art solution within the technical field of copy protection of digital data is presented in the International Patent Application published with the number WO 00/04688. There, a method and a system for protecting digitally watermarked media content includes generating digital tickets associated with the media content. The ticket holds information regarding a receiver and the copy protection status of the content as well as the digital watermark. The content of the ticket is processed by the receiver in order to determine whether or not the receiver is allowed to copy the content.

SUMMARY OF THE INVENTION

An object of the present invention is to provide a solution to a problem of how to provide a more flexible handling of copy protection of digital media content.

According to a first aspect, the invention as claimed in claim 1 below provides a solution by way of a method of controlling a digital media recorder capable of recording digital media sequences on a digital media carrier. A sub-sequence is extracted from an input media sequence, such as an audio or a video sequence. A digital fingerprint of the sub-sequence is calculated and compared with at least one first reference fingerprint, which is fetched from a primary database of fingerprints. The outcome of the comparison yields a first comparison value to be used in determining the action to take in the further processing. Depending on the first comparison value, recording of the input media sequence on the media carrier is either allowed or obstructed, e.g. disallowed. In the case recording of the sequence is allowed, the primary database is then updated with information that the digital media sequence has been recorded on the media carrier.

Preferably, the primary database of fingerprints includes a copy count number and a copy limit number associated with fingerprints in the list. Then, the step of comparing the sub-sequence fingerprint with the first reference fingerprint includes comparing the copy count number and the copy limit number and the step of updating the primary database includes updating the copy count number associated with the fingerprint.

In order to properly handle multiple occurrences of a sub-sequence within a media sequence, the invention preferably further involves comparing the sub-sequence fingerprint with at least one second reference fingerprint, said second reference fingerprint being fetched from a secondary temporary database of fingerprints. This comparison yields a second comparison value, which is used to determine the further processing. Depending on whether or not the second comparison value indicates that the fingerprint exists in the secondary database, the fingerprint is stored in the secondary database. The primary database is finally, when recording is completed, updated with information from the secondary database.

The recorder checks if any recording that is being made, has been made previously by looking up the fingerprint in the primary database. If that is the case, some appropriate action is taken, such as aborting the recording, or adding noise etc. Since the database has a finite size, older entries are removed in favour of newer ones, preferably on a first in-first out basis, which means that after a while recordings that were blocked will be permitted again. This results in that, within a preset amount of time, as determined by the size of the database, duplicate recordings are prohibited, but independent of the speed a which recordings are made.

It is to be noted that the addition of a copy count and copy limit with each data base entry allows duplicates to be made in series of more than one recording. For example if the copy limit is set to 3, a series of three duplicates can be made. Subsequently the user has to make a large number of other copies, and next a new series of three copies can be made etc.

For any new recording it is verified that the database does not contain its fingerprint, or if it does, that the maximum number of copies has not yet been made. Otherwise, the recording shall be prohibited, continued with reduced quality, or some other appropriate action shall be taken. That is, the recorder remembers what recordings have been made, by storing fingerprints in the primary database.

In other words, the technical effect of the present invention can be defined by the concept of a "speed bump," which does not prevent copies of being made, but rather limits the rate at which those copies can be made. In its basic form the concept is straightforward: let recorders prohibit more than a given number of copies to be made within a given time frame.

In order for the proposed speed bump mechanism to be effective, especially in the PC world, it should not be thwarted easily by making imperceptible changes to the digital content of the media. This rules out implementations that rely solely on cryptographic hash functions. However, a viable alternative to use is the robust audio hashing, or fingerprinting-, technique disclosed in the following paper: Jaap Haitsma, Ton Kalker and Job Oostveen, "Robust Audio Hashing for Content Identification," Content-Based Multimedia Indexing conference 2001, Brescia, Italy. This technique allows extraction of robust features from the recorded media content, which a recorder can keep in an internal database.

An advantage of the proposed mechanism is that no special preparation of the original media content is required as is the case with prior art systems that rely on signaling by embedded watermarks. This is also true for the recordings (e.g. remarking is not necessary). Therefore audibility issues do not play a role. Furthermore, intentional signal distortion threats, e.g. in order to remove watermarks, are non-existent either.

Another advantage of the invention is that usage for personal purposes is effected only to a small degree— depending on the permissible copy rate—while usage for (semi-) business purposes is substantially frustrated.

Yet another advantage is that also in PC based recorders the speed bump mechanism can operate autonomously, i.e. without help from the main processor of the PC, when realized in a separate hardware module in the recorder itself as will be discussed in some detail below.

A further advantage of the speed bump mechanism according to the invention is that the fingerprinting technology itself does not need to be standardized-it may even yield a competitive advantage to keep it proprietary just the concept itself and the effectiveness of the speed bump, i.e. the maximum number of copies per series and the amount of time that should pass until another series of copies is permitted.

According to a second aspect, the invention as claimed in claim 7 below provides a solution by way of a digital media recorder capable of recording digital media sequences on a digital media carrier, the technical effect and advantages of which correspond to the first aspect of the invention as discussed above.

BRIEF DESCRIPTION OF THE DRAWINGS

A digital media recorder and a method of controlling such a recorder will now be presented with reference to FIGS. 1, 2 and 3, where.

PREFERRED EMBODIMENTS

Although the embodiments will discuss only audio sequences and use terminology relating to audio recordings, other types of media are considered to be equivalents and will not be discussed separately. Moreover, it is to be understood that the invention is applicable to other kinds of digital recording media than the exemplified CD-R, such as media that are based on magnetic recording techniques.

Figure 1:
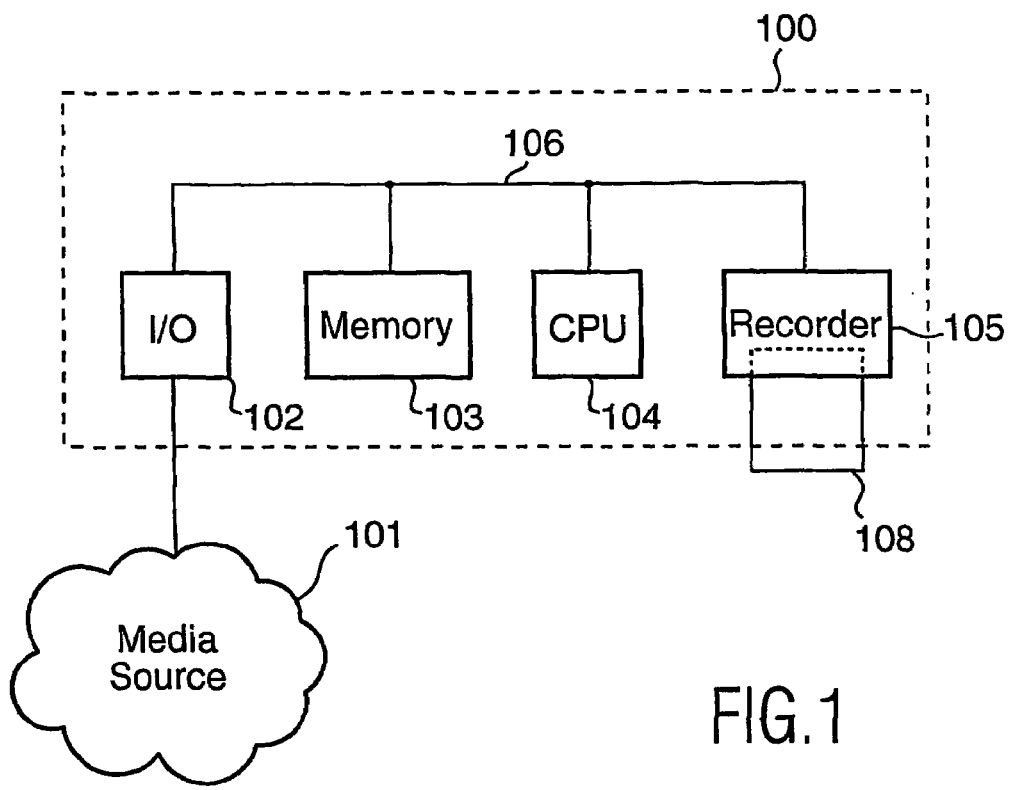
FIGS. 1 and 2 show schematically a digital media recorder according to the present invention.
Figure 2:
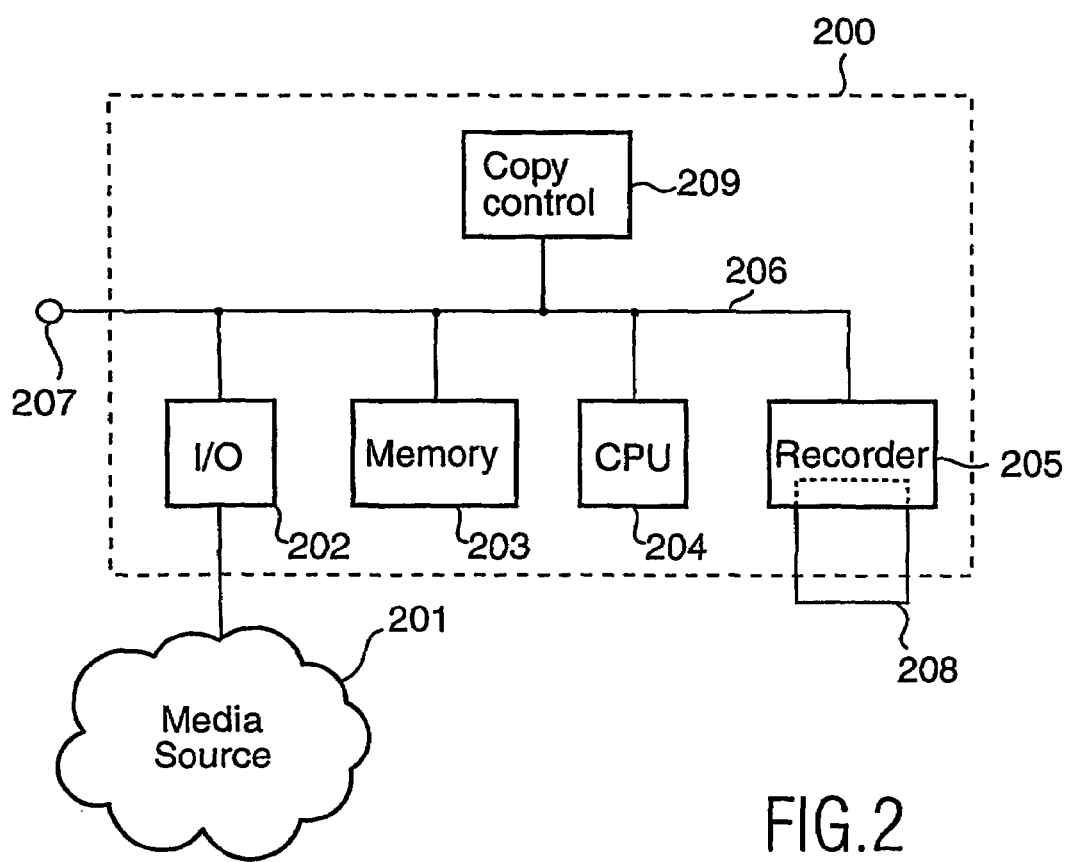

FIGS. 1 and 2 show, respectively, a digital recorder 100,200 comprising an input/output unit 102,202 connecting to a digital media source 101,201, memory 103,203, a processing unit 104,204 and a recording unit 105,205 capable of receiving removable blank recording media 108, 208 such as CD-R.

As FIG. 2 illustrates, a separate control unit 209 may be present in addition to the processing unit 204. As the skilled person realizes, all units are connected via a bus 106,206 and, as illustrated in FIG. 2, may also include a connection 207 to a computer. Media content to be handled by the recorder 100,200 originates in a media source 101,201. As the skilled person realizes, such a media source 101,201 may be in the form of a data stream from an external computer, a digital output from a digital playback device etc.

Figure 3:
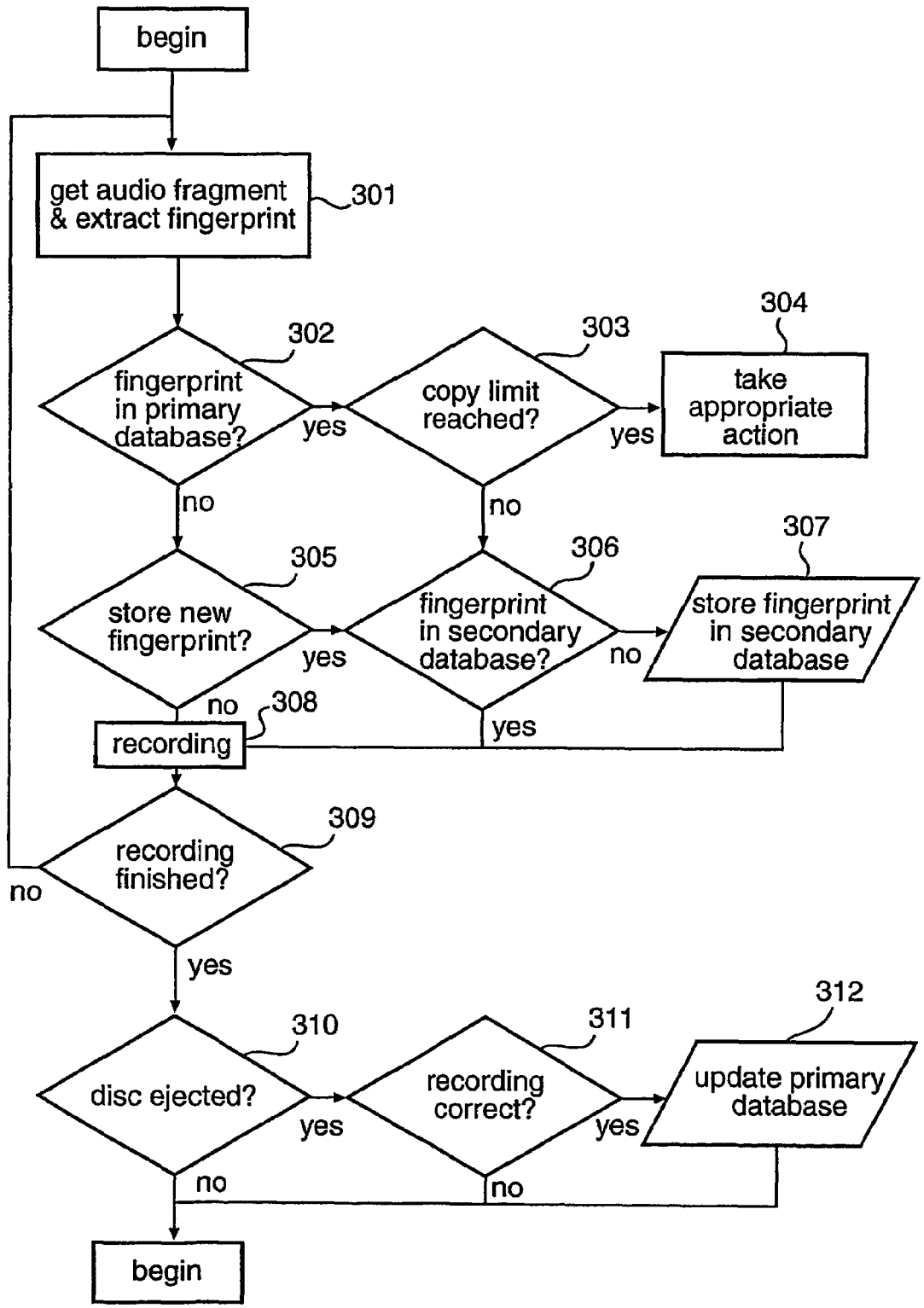
FIG. 3 shows a flow chart of a method according to the present invention.

As will be evident from the description to follow of a method according to the invention, the speed bump mechanism does not necessarily work on the level of albums or tracks, but rather on the basis of recording time, i.e. sub-sequences of tracks or albums. The flow chart in FIG. 3 shows a schematic overview of the algorithm. There are two databases that play a role: a primary database that contains fingerprints of recordings made on discs prior to the current one, and a secondary database that contains those of the current disc. Both databases are realized, as the skilled person understands, in the memory 103,203 of the recorder.

With reference to the flow chart in FIG. 3 as well as to the arrangements in FIGS. 1 and 2, a method according to the invention will now be described. The method is preferably realized in the form of control sequences, i.e. software, stored in the memory 103,203 of the recorder 100,200. The software is run by the processor 104,204, the copy control unit 209 and/or by both processor 104,204 and control unit 209 in cooperation.

Furthermore, the method assumes that a recording medium 108,208 in the form of a disc (e.g. CD-R) is inserted into a recorder according to the invention, such as a recorder disclosed in FIGS. 1 and 2. Moreover, reference will be made to the primary and a secondary database.

Beginning the inventive method, in an input and extraction step 301 fingerprints are extracted on a continuous basis from the audio content that is being received from the media source 101,201 and that is intended for recording.

Each of the extracted fingerprints is compared to a primary database for a match in a matching step 302. If no match is found, implying that a recording of the sequence is authorized, the method continues in a storage determination step 305. During the storage determination step 305 it is decided whether or not the fingerprint is to be stored in the secondary database. The decision is preferably based on criteria regarding time intervals, i.e. the duration of the sub-sequence in question. Another criteria to select the fingerprint for storage may be based on properties of the fingerprint itself. Any combination of criteria may also be used. These criteria will be discussed in some more detail below Continuing the inventive method, if a matching entry that has reached the copy limit is found in the matching step 302, a check is made in a checking step 303 whether the copy limit has been reached. An appropriate action will be taken in an action step 304 if the copy limit has been reached. The action taken in step 304 preferably has the effect of degrading the recording, hence decreasing the "value" of the recording, and includes such actions as aborting the recording process, continuing the recording process at a reduced quality as well as notifying a user of the action taken.

However, if the matching entry has not yet reached the copy limit, as is checked in a copy limit checking step 303, the fingerprint is stored in the secondary database, as indicated in a storage step 307. If the fingerprint is already present in the secondary database, there is no need for storing it again, as is indicated by the checking step 306.

The step of recording then takes place in a recording step 308 and proceeds according to procedures known in the art.

In a checking step 309, it is decided whether or not the recording is finished. If not, control returns to the step of input and extraction step 301.

When all recordings have been made correctly and also when the current disc is ejected from the drive, as checked in checking steps 310 and 311, the primary database is updated from the secondary database in an updating step 312. This updating step 312 involves incrementing the copy counters of the fingerprints that occur in both databases, and moving the remaining fingerprints from the secondary to the primary database using a first-in first-out strategy.

The above algorithm correctly deals with repetitions within a piece of audio, which frequently occurs in, e.g., classical music. Basically the idea is that it is not important how many copies exist on a single disc, because these cannot be sold or given away separately. Therefore, these are treated as a single instance.

The database is, as already presented, divided into two parts, namely the previous history of fingerprints in the primary database, and the fingerprints of the current disc in the secondary database. To ensure that the speed bump mechanism according to the invention is not activated for failed recordings, only he primary database is used for verification purposes. Updating of this database does not occur until the disc has been ejected, and all recordings on that disc are correct.

As discussed above in connection with the storage determination step 305, fingerprints of sub-sequences are stored in the secondary database at more or less regular time intervals. The effect of this is to introduce a frequent degradation of a recording, decreasing the "value" of an unauthorized recording of the media sequence.

A more detailed discussion of the criteria regarding the regularity of the fingerprint storage will now follow. As already discussed, when a copy limit has been reached for a particular media sequence the fingerprint is to be stored in the secondary database. The regularity, i.e. time scale, of these storage actions is preferably dependent on the type of content that is being copy controlled, and partly dependent on the fingerprinting algorithm used. The time scale for the sub-sequence should be significantly shorter than a complete media sequence that is under consideration. For example, for modern popular music where songs typically last no more than a few minutes, a one minute sub-sequence may be appropriate. This means that if an unauthorized recording is attempted, there will be several instances of the action step 304 (e.g. distortions of the recorded signal with a preset or adaptive duration and intensity) in that recording, substantially decreasing the quality of that (unauthorized) recording. For video sequences a sub-sequence time interval of 5 or 10 minutes may be appropriate, since a movie typically lasts well over one hour. Alternatively, an additional random time interval may also be used.

The regularity of the storage of sub-sequence fingerprints may also depend on the fingerprinting algorithm that is used. For example, the algorithm of the already referenced paper (Jaap Haitsma, Ton Kalker and Job Oostveen, "Robust Audio Hashing for Content Identification," Content-Based Multimedia Indexing conference 2001, Brescia, Italy) generates a substantial amount of information in a short amount of time. Consequently such a method is preferably used in "burst mode," i.e. fingerprint information is stored in the secondary database for short content fragments only. Other fingerprinting algorithms are conceivable that generate information at a much slower rate; it may even be possible to store all information in the database, which would imply that the interval decreases to zero and that the sub-sequence in fact is the complete media sequence.

An example of the performance of a method as described above will now be briefly reported.

Based on the fingerprinting method disclosed in the previously referenced paper: Jaap Haitsma, Ton Kalker and Job Oostveen, "Robust Audio Hashing for Content Identification, " Content-Based Multimedia Indexing conference 2001, Brescia, Italy, the following estimates for the performance of the speed bump algorithm as presented above, can be made. Needless to say, this is only one example and is included here for illustration purposes only. Other optimizations and choices are possible, as the skilled person will realize.

Fingerprint information is generated at a rate of about 1 kB per 3 audio-seconds. For each audio-minute the fingerprint of a contiguous ⅜ audio-sec fragment is stored in the database, which takes about 16 bytes employing a reasonable optimization technique. Assuming that a speed bump of 16 real-time hours is required and recording occurs at single speed, the primary and secondary database sizes should be about 15 kB and 1 kB, respectively. For searching the database a bit-error rate in the fingerprints of 1-in-8 yields sufficient robustness against common signal processing "attacks" (e.g. all-band filtering, equalization, subsequent D/A and A/D conversions, and mp3 compression at 128 kbps). Assuming a brute force search strategy, it takes on average 4 byte comparisons per fingerprint to decide that a there is no match, which translates to a required memory bandwidth to the database of about 320 kB/audio-sec. Finally, the false positive rate can be estimated to be about $2 \times 10^{-12}$ per audio-sec. Note that at higher recording speeds the figures for the primary database size, memory bandwidth, and false positive rate have to be adjusted accordingly to maintain the effectiveness of the speed bump.

Hence, to summarize: a digital media recorder and a method of controlling such is shown. During attempts to copy media content such as audio or a video sequences, sub-sequences are extracted from an input media sequence. A digital fingerprint of the sub-sequence is calculated and compared with at least one first reference fingerprint from a database. The outcome of the comparison determines the action to take in the further processing. Recording of the input media sequence on the media carrier is either allowed or obstructed, e.g. disallowed. In the case recording of the sequence is allowed, the database is updated with information that the digital media sequence has been recorded. This has the effect of a "speed bump," which limits the rate at which those copies of media content can be made, i.e. the effect is that of prohibiting more than a given number of copies within a given time frame.

The invention claimed is:

1. A method of controlling a digital media recorder capable of recording digital media sequences on a digital media carrier, comprising the steps of:
   extracting, from an input media sequence, a media sub-sequence,
   calculating a sub-sequence digital fingerprint from the media sub-sequence,
   comparing the sub-sequence fingerprint with at least one first reference fingerprint, said first reference fingerprint being fetched from a primary database of fingerprints, yielding a first comparison value,
   depending on the first comparison value, allowing or obstructing recording of the input media sequence on the media carrier,
   comparing the sub-sequence fingerprint with at least one second reference fingerprint, said second reference fingerprint being fetched from a secondary database of fingerprints, yielding a second comparison value,
   depending on the second comparison value, storing the fingerprint in the secondary database,
   depending on at least the first comparison value, updating the primary database with information from the secondary database that the digital media sequence has been recorded on the media carrier.

2. A method according to claim 1, where the primary database of fingerprints includes a copy count number and a copy limit number associated with fingerprints in the list, where the step of comparing the sub-sequence fingerprint with the first reference fingerprint includes comparing the copy count number and the copy limit number and where the step of updating the primary database includes updating the copy count number associated with the fingerprint.

3. A method according to claim 1, further comprising the step of removing older entries from the primary database in favor of newer entries so as to limit the size of the primary database to a predetermined number.

4. A method according to claim 1, where the updating of the primary database is dependent on whether or not the recording of the at least one media sub-sequence is completed.

5. A method according to claim 1, where the obstruction of the recording includes at least one of the actions: aborting the recording, reducing the quality of the recording, notifying a user of the obstruction.

6. A method according to claim 1, where the extraction of the sub-sequence includes extraction during a predetermined time interval, said time interval having a length determined at least partly by the type of the media sequence.

7. A digital media recorder capable of recording digital media sequences on a digital media carrier, comprising:
   means for comparing the sub-sequence fingerprint with at least one second reference fingerprint, said second reference fingerprint being fetched from a secondary database of fingerprints, yielding a second comparison value,
   means for storing the fingerprint in the secondary database
   means for extracting, from an input media sequence, a media sub-sequence,
   means for calculating a sub-sequence digital fingerprint from the media sub-sequence,
   means for comparing the sub-sequence fingerprint with at least one first reference fingerprint, said first reference fingerprint being fetched from a primary database of fingerprints, yielding a first comparison value,
   means for analyzing the first comparison value,
   means for recording the input media sequence on the media carrier,
   means for obstructing recording of the input media sequence on the media carrier depending on the first comparison value,
   means for updating the primary database with information from the secondary database that the digital media sequence has been recorded on the media carrier.

8. A recorder according to claim 7, where the primary database of fingerprints includes a copy count number and a copy limit number associated with fingerprints in the list, where the means for comparing the sub-sequence fingerprint with the first reference fingerprint includes means for comparing the copy count number and the copy limit number and where the means for updating the primary database includes means for updating the copy count number associated with the fingerprint.

9. A recorder according to claim 7 being arranged to remove older entries from the primary database in favor of newer entries so as to limit the size of the primary database to a predetermined number.

10. A recorder according to claim 7, where the means for updating the primary database are arranged to operate in dependence on means capable of establishing whether or not the recording of the at least one media sub-sequence is completed.

11. A recorder according to claim 7, where the obstruction means includes obstructing means capable of at least one of the actions: aborting the recording, reducing the quality of the recording, notifying a user of the obstruction.

12. A recorder according to claim 7, where the means for extraction of the sub-sequence includes means for extraction during a predetermined time interval, said time interval having a length determined at least partly by the type of the media sequence.

13. A computer comprising a recorder according to claim 7 wherein the computer is configured to control the recorder.

14. A method as in claim 1 wherein the secondary database updates the primary database in response to ejecting the media carrier.

15. A recorder as in claim 7 wherein the secondary database updates the primary database in response to ejecting the media carrier.

16. A computer as in claim 13 wherein computer is configured to update the primary database with the secondary database in response to ejecting the media carrier.

* * * * *